US010069421B2

(12) United States Patent
Todorov et al.

(10) Patent No.: US 10,069,421 B2
(45) Date of Patent: Sep. 4, 2018

(54) MULTI-PHASE SWITCHING VOLTAGE REGULATOR HAVING ASYMMETRIC PHASE INDUCTANCE

(71) Applicant: Infineon Technologies Austria AG, Villach (AT)

(72) Inventors: Emil Todorov, Fremont, CA (US); Benjamim Tang, Rancho Palos Verdes, CA (US)

(73) Assignee: Infineon Technologies Austria AG, Villach (AT)

(*) Notice: Subject to any disclaimer, the term of this patent is extended or adjusted under 35 U.S.C. 154(b) by 313 days.

(21) Appl. No.: 14/614,929

(22) Filed: Feb. 5, 2015

(65) Prior Publication Data
US 2016/0233766 A1   Aug. 11, 2016

(51) Int. Cl.
*G05F 1/00* (2006.01)
*H02M 3/158* (2006.01)
(Continued)

(52) U.S. Cl.
CPC ............ *H02M 3/1584* (2013.01); *H02M 1/15* (2013.01); *H02M 2001/0032* (2013.01); *Y02B 70/16* (2013.01)

(58) Field of Classification Search
CPC .. H02M 3/158; H02M 3/1588; H02M 3/1582; H02M 2001/0045;
(Continued)

(56) References Cited

U.S. PATENT DOCUMENTS 5,982,160 A    11/1999 Walters et al.
6,795,009 B2 *  9/2004 Duffy .................... H02M 3/157
                                                  323/283
(Continued)

FOREIGN PATENT DOCUMENTS

CN    101204002 A    6/2008
CN    101286698 A   10/2008
(Continued)

OTHER PUBLICATIONS

Sengupta, U., "Duty-Cycle is One Key to Buck Converters' Output Current Capability", EE Times, available online at: http://www.eetimes.com/document.asp?doc_id=1225917&print=yes, Apr. 16, 2003, pp. 1-6.
(Continued)

*Primary Examiner* — Adolf Berhane
*Assistant Examiner* — Afework Demisse
(74) *Attorney, Agent, or Firm* — Murphy, Bilak & Homiller, PLLC (57) ABSTRACT

A multi-phase switching voltage regulator includes a controller and a plurality of power stages each configured to deliver output current to a load through an inductor. At least one of the inductors has a higher open circuit inductance than the other inductors so that at least one of the power stages has a different output inductance compared to the other power stages. The controller is configured to control switching of the power stages so as to regulate an output voltage of the multi-phase switching voltage regulator, including allowing all of the power stages to provide current to the load through the respective inductors during a full power event at the load and preventing all of the power stages except for the at least one power stage having the higher open circuit inductance from providing current to the load during a low power event at the load.

26 Claims, 4 Drawing Sheets

(51) Int. Cl.
*H02M 1/15* (2006.01)
*H02M 1/00* (2006.01)

(58) Field of Classification Search
CPC ......... H02M 2001/0067; H02M 3/156; H02M 2003/1552; H02M 3/155; H02M 3/145
USPC ........ 323/222, 223, 224, 225, 271, 282–285
See application file for complete search history.

(56) References Cited

U.S. PATENT DOCUMENTS

| | | | |
|---|---|---|---|
| 8,575,902 B1 * | 11/2013 | Wei | H02M 3/158 323/269 |
| 8,901,908 B2 | 12/2014 | Tang et al. | |
| 2008/0307242 A1 | 12/2008 | Qu | |
| 2013/0093408 A1 * | 4/2013 | Ikriannikov | H01F 3/10 323/355 |
| 2014/0002037 A1 | 1/2014 | Babazadeh et al. | |
| 2014/0152350 A1 * | 6/2014 | Ikriannikov | H02M 3/1582 327/109 |
| 2015/0015219 A1 | 1/2015 | Ishino et al. | |

FOREIGN PATENT DOCUMENTS

| | | |
|---|---|---|
| CN | 101976951 A | 2/2011 |
| DE | 102012106866 A1 | 1/2013 |

OTHER PUBLICATIONS

Tschirhart, D. et al., "Inductor Current Measurement Compensation for Switching Voltage Regulators", Unpublished U.S. Appl. No. 14/287,978, filed May 27, 2014, pp. 1-26.

Zhang, X. et al., "Digital PWM/PFM Controller with Input Voltage Feed-Forward for Synchronous Buck Converters", Twenty-Third Annual IEEE Applied Power Electronics Conference and Exposition 2008 (APEC 2008), Austin, TX, USA, Feb. 24-28, 2008, pp. 523-528.

Wüstehube, Joachim, "Schaltnetzteile", 2. überarbeitete Auflage, Expert Verlag Grafenau, 1982, pp. 40-47.

* cited by examiner

MULTI-PHASE SWITCHING VOLTAGE REGULATOR HAVING ASYMMETRIC PHASE INDUCTANCE

TECHNICAL FIELD

The present application relates to multi-phase switching voltage regulators, in particular multi-phase switching voltage regulators having asymmetric phase inductance.

BACKGROUND

Switching voltage regulators are widely used in modern electronic systems for a variety of applications such as computing (server and mobile) and POLs (Point-of-Load Systems) for telecommunications because of their high efficiency and small amount of area/volume consumed by such converters. Widely accepted switching voltage regulator topologies include buck, boost, buck-boost, forward, flyback, half-bridge, full-bridge, and SEPIC topologies. Multi-phase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Typical multi-phase buck converter designs for CPU core voltage (Vcore) applications utilize from two to six or more phases, where Vcore is the power supply voltage supplied to a CPU (central processing unit), GPU (graphics processing unit), or other device containing a processing core. Conventional multi-phase buck converter designed for Vcore applications use the same inductance value for each phase. Regulators for Vcore applications must support both high load operation when the processor operation activity level and its current consumption are high, and light load operation when the processor operation activity level and its current consumption are low. In addition, regulators often have tough transient specifications to accommodate quickly when switching between light load and high load operation while maintain good regulation, and therefore require relatively low inductance values such as 150 nH per phase. For end customers, it is desirable that the design pass such stringent transient specifications, while also operating with good light and peak load efficiencies. To improve light load efficiency, the phases should have higher inductance values as this reduces the ripple current in the inductor. However, the inductance value is limited to support high phase currents. Generally the saturation current for an inductor decreases as the inductance is increased for the same physical size, so lower inductances can support higher output current. Additionally, phases with higher inductance values are far less likely to pass Vcore fast transient load response specifications, so there is a trade-off required in selecting the optimal inductance for these designs. Besides Vcore applications, multi-phase voltage regulator can be used in memory applications where an asymmetrical phase inductance approach can be implemented with similar positive results.

SUMMARY

According to an embodiment of a multi-phase switching voltage regulator, the multi-phase switching voltage regulator comprises a controller and a plurality of power stages each configured to deliver output current to a load through an inductor. At least one of the inductors has a higher open circuit inductance than the other inductors so that at least one of the power stages has a different output inductance compared to the other power stages. The controller is configured to control switching of the power stages so as to regulate an output voltage of the multi-phase switching voltage regulator, including allowing all of the power stages to provide current to the load through the respective inductors during a full power event at the load and preventing all of the power stages except for the at least one power stage having the higher open circuit inductance from providing current to the load during a low power event at the load.

According to an embodiment of a digital controller for a multi-phase switching voltage regulator having a plurality of power stages each of which is configured to deliver output current to a load through an inductor, at least one of the inductors having a higher open circuit inductance than the other inductors so that at least one of the power stages has a different output inductance compared to the other power stages, the digital controller comprises control circuitry configured to control switching of the power stages so as to regulate an output voltage of the multi-phase switching voltage regulator. This includes allowing all of the power stages to provide current to the load through the respective inductors during a full power event at the load and preventing all of the power stages except for the at least one power stage having the higher open circuit inductance from providing current to the load during a low power event at the load.

According to another embodiment of a multi-phase switching voltage regulator, the multi-phase switching voltage regulator comprises a controller and a plurality of power stages each configured to deliver current to a load. Each of the power stages comprises a high-side transistor and a low-side transistor coupled at a common node to the load through an inductor. At least one of the power stage inductors has a higher open circuit inductance than the other power stage inductors so that the at least one power stage has a different output inductance compared to the other power stages. The controller is configured to control switching of the power stages to regulate an output voltage of the multi-phase switching voltage regulator.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Multi-phase switching voltage regulator embodiments described herein provide at least one phase (power stage) with a different inductance value that the other phases. The terms 'phase' and 'power stage' are used interchangeably herein to describe the output components (e.g. driver circuitry, high side and low side transistors, inductors, etc.) of a multi-phase switching voltage regulator each of which contributes part of the total current delivered to the load under regulation. In some cases, one phase has a different inductance value that the other phases. In other cases, two or more phases have a different inductance value that the other phases. In still other cases, all phases have different inductance values. In each case, a higher inductance value e.g. up to 2× or higher than the nominal inductance used for the other phases can be applied to the phase which always operates as a single phase or in a combination with another phase in power saving mode(s). By using a higher inductance value(s) for at least one phase which operates in power savings mode(s), a boost (improvement) in light load efficiency is provided. Output ripple, high load efficiency and current sense error are reduced by providing at least one phase of a multi-phase switching voltage regulator with a different inductance value that the other phases.

Figure 1:
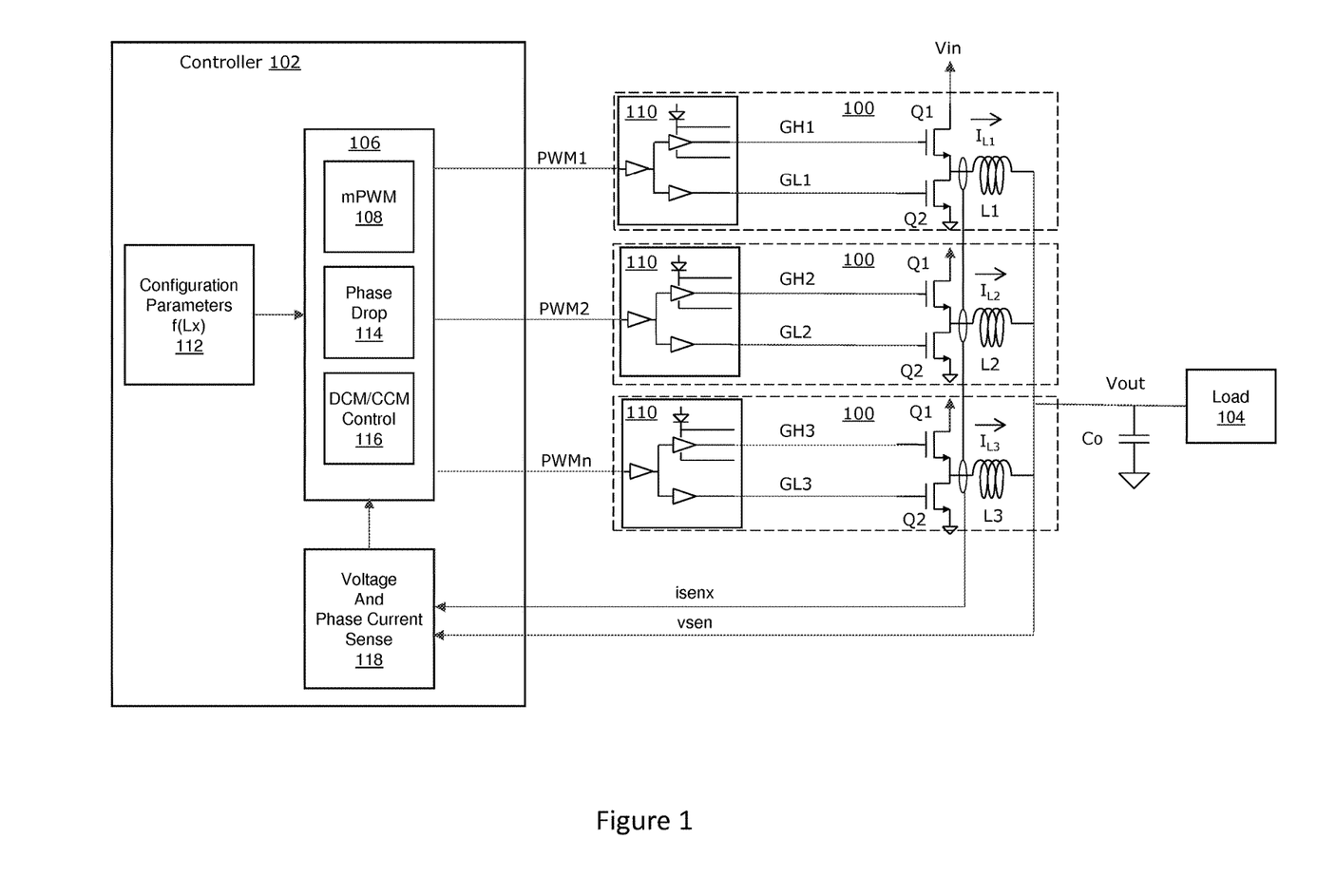
FIG. 1 illustrates a block diagram of an embodiment of a multi-phase switching voltage regulator having asymmetric phase inductance.

FIG. 1 illustrates an embodiment of a multi-phase switching voltage regulator comprising a plurality of power stages (phases) 100 and a digital controller 102 such as a microcontroller, microprocessor, ASIC (application-specific integrated-circuit), etc. for controlling operation of the individual power stages 100. Each of the power stages 100 represents one phase of the switching voltage regulator and is configured to deliver a phase current ($I_{Ln}$) through a separate inductor ($L_N$) to a load 104. The load 104 is connected to the multi-phase switching voltage regulator via the inductors and an output capacitor ($C_O$). The load 104 can be a high-performance integrated circuit such as a microprocessor, graphics processor, network processor, etc. or other type of integrated circuit requiring voltage regulation such as a POL (point-of-load).

Each power stage 100 includes a high-side transistor (Q1) and a low-side transistor (Q2) for coupling to the load 104 through the corresponding inductor, and driver circuitry 110 to receive a PWM signal from the controller 102 and generate the gate drive signals GH and GL to drive Q1 and Q2 on and off. The high-side transistor of each power stage 100 switchably connects the load 104 to an input voltage (Vin) of the multi-phase switching voltage regulator 100, and the corresponding low-side transistor switchably connects the load 104 to ground at different periods. Three power stages 100 are shown in FIG. 1 for ease of illustration only. In general, the multi-phase switching voltage regulator 100 has at least two power stages 100 e.g. typically up to six power stages or even more, at least one of which has a different open circuit inductance $L_N$ compared to the other power stages 100. As used herein, the term 'open circuit inductance' refers to the real/exact value as opposed to the nominal/average value.

The digital controller 102 includes control circuitry 106 for regulating the voltage ($V_{out}$) delivered to the load 104 by the power stages 100, by adjusting the phase currents ($I_{L1}$, $I_{L2}$, ..., $I_{LN}$) delivered to the load 104. The control circuitry 106 can include a multi-phase pulse width modulator (mPWM) 108 for switching the high-side and low-side transistors of each power stage 100 via a corresponding PWM control signal (PWM1, PWM2, ..., PWMn) so that each power stage 100 can source or sink current to the load 104 through the corresponding inductor and the high-side or low-side transistor in response to the PWM signal applied to that power stage 100. When a PWM control signal is at a logic level high, the corresponding high-side transistor is placed in a conductive state, the inductor current is sourced or sunk through the high-side transistor, and the current through the inductor increases for the duration. This is generally referred to as the 'on-time' and that power stage 100 is considered to be 'turned on'. When the PWM control signal is at a logic level low, the corresponding low-side transistor is placed in a conductive state, current is sourced or sunk from the low-side transistor, and the current through the inductor decreases for the duration. This is generally referred to as the 'off-time' and that power stage 100 is considered to be 'turned off'. When the PWM control signal is at a trivalent or high impedance logic level (the PWM control signal is neither high nor low), both the corresponding high-side and the low-side transistors are placed in a non-conductive state, current is sourced or sunk through either the low-side or high side transistor body diodes, and the magnitude of the current through the inductor decreases towards zero. This is generally referred to as the 'HiZ-time' or 'inactive time' and that power stage 100 is considered to be in 'High Z' or inactive.

Multi-phase buck regulators generally operate in fixed frequency CCM (continuous current mode). In fixed frequency CCM, the PWM signal for each phase is high for a portion of the switch cycle, and is low for a portion of the switch cycle, and the switch cycle is relatively constant from cycle to cycle. For a fixed period in time, a fixed number of pulses are expected, with relatively constant on and off time for each pulse. The regulator adjusts the PWM cycles in order to maintain the output voltage constant while adjusting the inductor currents to match the load requirements. The inductor current rises and falls each cycle, so it is not constant, but produces a constant average current during steady state operation with a ripple current corresponding to each cycle, where the ripple current is dependent on the switching frequency, the inductance, the duty cycle of the PWM control signal, and the input and output voltages (Vin, Vout). By operating each of the phases at the same frequency but at equally spaced phase offsets, and regulating each phase so that the average current in each phase is relatively matched, this allows the ripple current in each phase to be cancelled and the overall current supplied to the load by all the phases will have lower overall ripple. Multi-phase buck regulators are ideally suited for delivering high current to the load because of this ability to divide the load current requirement evenly among many phases, while allowing physically small implementations by supporting low inductance values with high ripple current that is cancelled at the load by the fixed frequency multi-phase operation. However, this approach is not as well suited for light load operation, because the ripple current is high relative to the load current, and the switching losses for each phase is also high. Light load operation generally requires the multi-phase buck regulator to modify its mode of operation such that some phases are inactive, with the PWM control signal at high Z and neither the high side nor the low side transistor on, and that the active phase or phases operate at the highest possible efficiency, such as operating in DCM (discontinuous conduction mode).

In a DCM switching mode such as PFM (pulse frequency modulation), the low-side transistor of each power stage 100 active in DCM is not allowed to be conductive once its inductor current reaches zero. The cycle then consists of an on-time, followed by an off-time, followed by a HiZ time. The inductor current rises during the on time and falls during the off time. During the HiZ time, the inductor current approaches zero and does not change for the duration of the cycle once it is zero. If the transition from off time to HiZ time occurs as the inductor current is near zero, the power losses in DCM are minimized. As a result, the inductor current does reach zero during part of the switching cycle in DCM. Multi-phase switching voltage regulators are typically configured in DCM during light load condition. In CCM, the inductor current is positive for the entire cycle if the load current exceeds a value which is a function of the ripple current. If the load current is lower than this value, than the inductor current will be negative for a portion of the switch cycle. That is in DCM, the inductor current is always positive or zero and in CCM the inductor current can be positive or negative but does not stay at zero. The inductor current can cross zero and go negative e.g. at no-load, and the multi-phase switching voltage regulator can operate in CCM where the triangular inductor current is centered at zero. Multi-phase switching voltage regulators are typically configured in CCM during full power conditions at the load 104.

In either CCM or DCM, driver circuitry 110 of each power stage 100 provides gate drive signals (GHn/GLn) to the gates of the respective high-side and low-side transistors of the corresponding power stage 100 in response to the PWM control signals provided by the digital controller 102. The activation state of the power stages 100 and the duty cycle of the high-side and low-side transistors are determined at least in part based on the output voltage ($V_{out}$) applied to the load 104, so that the multi-phase switching voltage regulator can react as quickly and reliably as possible to changing load conditions.

Under light load conditions, the load draws less current. Light load efficiency of the multi-phase switching voltage regulator can be improved by using power stage(s) 100 which have the highest inductance value(s). To this end, at least one of the inductors of the multi-phase switching voltage regulator has a higher open circuit inductance than the other inductors so that at least one of the power stages 100 has a different output inductance compared to the other power stages. For example in FIG. 1, the first power stage has a higher output inductance (L1) and the other power stages 100 have a lower output inductance (L2, L3). In other cases, two or more of the power stages 100 have a higher output inductance value that the other power stages. In still other cases, all power stages 100 have different inductance values.

In each case, the power stage(s) 100 with the higher value output inductance(s) have less current handling capability than the power stages 100 with lower value output inductance(s). As such, the digital controller 102 utilizes these power stage(s) 100 during light load conditions e.g. by operating these power stages 100 in DCM. The remaining power stages 100 with lower value output inductance are active during higher power conditions at the load 104. This way, the multi-phase switching voltage regulator operates with high light-load efficiency in DCM while providing sufficiently high current handling capacity in CCM.

The digital controller 102 may or may not be aware of the asymmetric nature of the power stage output inductances. In either case, the controller 102 is configured to control switching of the power stages 100 so as to regulate the output voltage (Vout) of the multi-phase switching voltage regulator under both light-load and full power conditions at the load 104, by allowing all of the power stages 100 to provide current to the load 104 through the respective inductors during a full power event at the load 104 and preventing all of the power stages 100 except for the at least one power stage 100 having the higher open circuit inductance from providing current to the load 104 during a low power event at the load e.g. when the multi-phase switching voltage regulator is configured in DCM such as PFM.

If the digital controller 102 is unaware of the asymmetric nature of the power stage output inductances, the output inductances of the power stages 100 can be selected such that the inductance asymmetry has little or no adverse effect on regulator performance. That is, the difference between the largest and smallest power stage output inductances can be selected within a range that does not require the controller 102 to account for the difference. For example, one or more of the power stages 100 can have an output inductance of 220 nH and/or 180 nH and the remaining power stages 100 can have an output inductance of 150 nH. The power stages 100 with the 220 nH and/or 180 nH output inductance are active during light load conditions and all power stages 100, including the power stages 100 with the 150 nH output inductance, are active during full power conditions at the load 104. In this case, the controller 102 is provided a single output inductance value (Lx in FIG. 1) as part of the regulator configuration parameters 112 utilized by the digital controller 102 in determining the individual switching control of the power stages 100.

Again considering the exemplary 150 nH to 220 nH output inductance range given above, the single output inductance value Lx provided to the digital controller 102 can be set to some value between the highest output inductance value and the lowest output inductance value e.g. 140 nH or some other value between 150 nH and 220 nH. The controller 102 performs various (standard) multi-phase regulator functions such as current balancing, phase dropping, current sense, phase current protection, dynamic response, etc. as a function f(Lx) of the single output inductance. Although computations performed by the controller 102 such as current estimation, peak current, input current estimation, current sensor gain (APC or Amps/Code), etc. . . . are affected and somewhat suboptimal if the controller 102 is not capable of accounting for the difference between the power stage output inductances, the use of asymmetric power stage inductances improves light load efficiency while still providing acceptable transient responses in a multi-phase application design with different load step transient conditions. The controller 102 also includes phase drop logic 114 for managing which power stages are active and which ones are inactive (i.e. dropped) under different load conditions. The controller 102 further includes DCM/CCM control logic 116 for controlling regulator operation in DCM and CCM switching modes. The controller 102 also includes voltage and phase current sense circuitry 118 for sensing, measuring or estimating the output voltage (Vout) and individual phase currents ($I_{L1}, I_{L2}, \ldots, I_{LN}$), respectively.

Figure 2:
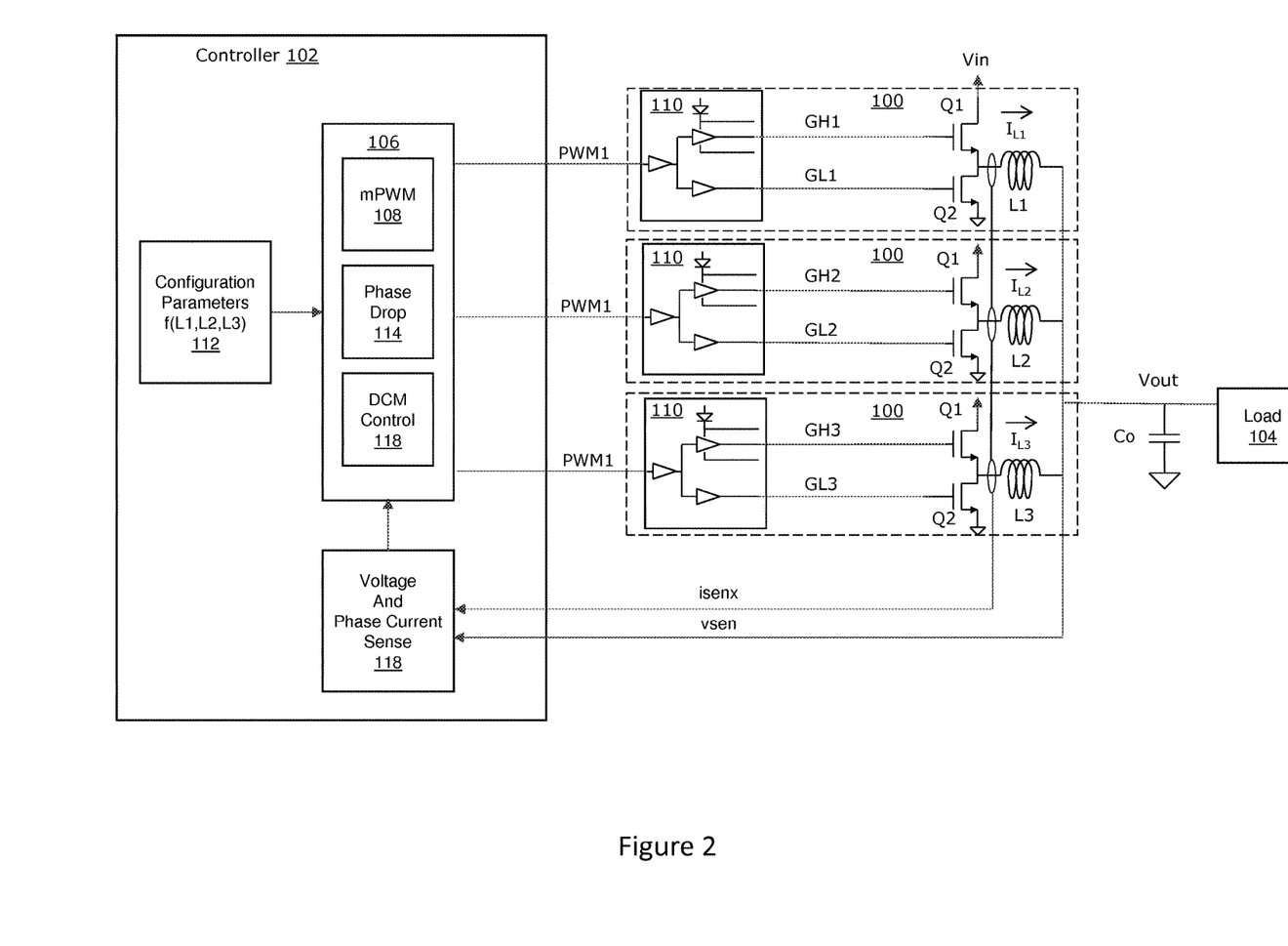
FIG. 2 illustrates a block diagram of another embodiment of a multi-phase switching voltage regulator having asymmetric phase inductance.

FIG. 2 illustrates another embodiment of the multi-phase switching voltage regulator in which the digital controller 102 does account for the different (asymmetric) open circuit inductances of the power stages 100 in controlling the switching of the power stages 100. According to this embodiment, the different open circuit inductance values or equivalent parameters (L1, L2, L3 in FIG. 2) are stored in memory along with an indication of the power stage 100 associated with each of the different open circuit inductances. One or more of the power stages 100 operates with a higher (asymmetric) phase inductance compared to the remaining power stages 100, and the controller 102 is configured to support asymmetric current balancing, phase dropping, current sense, phase current protection, dynamic response, etc. as a function of the asymmetry in the power stage output inductances (f(L1,L2,L3) in FIG. 2) while also supporting multi-phase operation, with optimized efficiency when operating with dropped phases or in PFM in lower power modes of operation.

Regardless of whether the controller 102 accounts for the different (asymmetric) open circuit inductances of the power stages 100, the controller 102 can switch the power stages 100 at the same frequency, but not at uniform spacing. Alternatively, the controller 102 can switch the power stages 100 at different frequencies. In still another embodiment, the controller 102 can switch the power stages 100 at non-uniform sequencing. Thus the controller 102 is not limited to fixed frequency, uniformly spaced, multi-phase operation, but can also account for the different inductances and current handling capability of each phase to optimize the operation when all phases are active and delivering the maximum load current, but also when the load current is low and each phase can then be optimized for maximizing the efficiency, transient, or ripple performance of the overall system.

Figure 3:
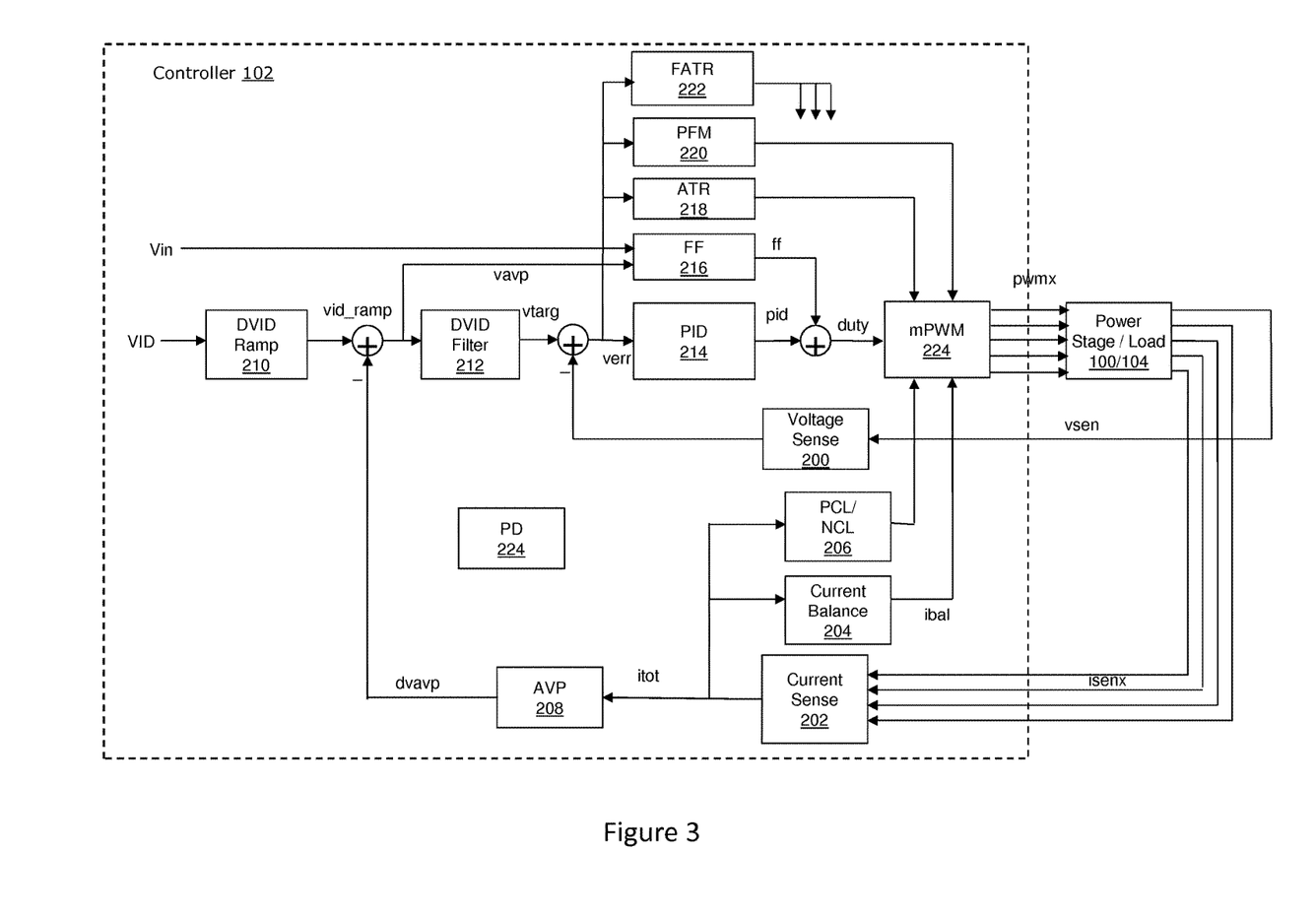
FIG. 3 illustrates a block diagram of an embodiment of a digital controller for a multi-phase switching voltage regulator having asymmetric phase inductance.

FIG. 3 illustrates a more detailed view of the digital controller 102, and the controller logic units which can utilize knowledge of the (asymmetric) power stage output inductances in controlling the switching of the power stages 100. The power stages 100 and load 104 are illustrated as a single block in FIG. 3 for ease of illustration.

The digital controller 102 includes a voltage sense unit 200 for converting an analog voltage feedback signal (vsen) into a digital controller representation of the output voltage Vout. A current sense unit 202 converts analog phase current feedback signals (isenx) into a digital controller representation of the phase currents $I_{L1}, I_{L2}, \ldots, I_{LN}$, including a total estimate (itot) of all the phases currents. The controller 102 also includes a current balance unit 204 for generating a compensating difference (ibal) for the phase duty cycles (duty) to maintain a target balance between the phase currents. A positive current limit (PCL)/negative current limit (NCL) unit 206 limits the phase duty cycles (duty) to prevent exceeding the positive and negative current limits of each phase. An AVP (adaptive voltage position) unit 208 computes the change (dvavp) in the regulator set-point based on the target load line droop and the output current. A dynamic voltage transition (DVID) ramp unit 210 generates ramp rate controlled transitions (vid_ramp) from a previous VID (voltage ID) to the target VID (vtarg).

The digital controller 102 further includes a DVID filter 212 for generating the controller target voltage (vtarg) and providing the desired output voltage response to changes in the VID by waveform shaping the DVID and AVP computed output voltage. A PID (proportional-integral-derivative) control loop compensation filter 214 is implemented by the controller 102 using corresponding proportional, integral and derivative gain terms. A feedforward (FF) control loop 216 computes the open loop duty cycle (ff) based on the target output voltage vtarg and input voltage (Vin). An active transient response (ATR) unit 218 of the controller 102 provides an asynchronous nonlinear control loop which improves the transient response of the system to large transients. A phase frequency modulation (PFM) unit 220 of the controller 102 controls power stage switching under light load conditions to optimize power efficiency. A frequency active transient response (FATR) unit 222 of the controller 102 is an adaptive control loop optimizer for minimizing the peaking of output impedance and voltage deviations over a dynamic load repetition frequency. A mPWM unit 224 of the controller 102 generates the individual phase response (pwmx) based on the PID, current balance, PFM, ATR, and FATR controls. A phase drop (PD) unit 224 of the controller 102 is configured to control the number of power stages (phases) in operation to maximize the efficiency over the range of load current. The PD unit 224 drops (sheds) one or more of the power stages 100 having lower output inductance during light load conditions so that the power stage(s) 100 with higher output inductance are the power stage(s) 100 which provide current to the load 104 under these conditions. As load current demand increases, the PD unit 224 adds one or more of the previously dropped power stages 100 with lower output inductance for supplying current to the load 104.

In FIG. 3, vsen is the analog feedback signal representing the output voltage, isenx is the analog feedback signal representing the individual phase currents through each of the inductors, itot is the controller representation of the sum of the phase currents (or total output current), iph is the controller representation of the individual phase currents through each of the inductors, vid_ramp is the controller representation of the output set-point voltage ID (VID), with ramp rate controlled transitions from a previous VID to the target VID, dvavp is the controller representation of the AVP output voltage droop as a function of output current, vavp is the controller representation of the AVP output voltage as a function of set-point voltage ID (vid) and output current droop, vtarg is the controller representation of the target voltage, taking into account waveform shaping from the DVID filter to provide the desired output voltage response to changes in VID, verr is the controller representation of the error voltage, pid is the controller representation of the control loop response based on a configurable PID compensator, ff is the controller representation of a feedforward computation of the duty cycle, duty is the controller representation of the duty cycle to be generated based on the sum of the pid and ff components, pwmx is the controller digital output representing the desired power stage state (high side on, low side on, high impedance), generated at the duty cycle set by the control loop, and L1, L2, L3 are the controller parameters representing the output inductance per power stage 100, or individual phase inductances.

Operation of the controller units which can utilize knowledge of the asymmetric power stage output inductances to better optimize switching control of the power stages 100 is described next in greater detail. For example, the current sense unit 202 can be further optimized to account for different phase inductances and their effect on phase ripple current, improving current sense accuracy. The current balance unit 204 can be further optimized to account for different phase current handling capabilities, and respond to changes in duty cycle due to the different phase inductances used. The PCL/NCL unit 206 can be further optimized to account for different duty cycle limitations in each power stage 100 due to the different phase inductances used. The PD unit 214 can be further optimized to account for different optimal current loading for dynamic phase shedding based on the different phase inductances used. The AVP unit 208 can be further optimized to account for different optimal bandwidths based on the different phase inductances used.

The PID compensator 214 can be further optimized to account for different optimal gains and bandwidths based on the different phase inductances used. The FF unit 216 can be further optimized to account for different optimal open loop duty cycles based on the different phase inductances used. The PFM unit 220 can be further optimized to account for different optimal pulse widths based on the different phase inductances used. The digital controller 102 can implement none, a single one or various ones of these asymmetric inductance based control functions, some of which are described next in even greater detail.

PFM is a version of DCM where a buck converter is operated with an 'On Time' (or just Ton), 'Off Time' (or just Toff), and 'HiZ Time' (or just HiZ) such that during Ton the current in the inductor ramps from 0 to a maximum current Imax, during the Toff the current in the inductor ramps from Imax to 0, and during HiZ the inductor current remains at 0. PFM can be implemented in a digital controller where Ton and Toff are computed as a function of Vin, Vout, and L, and a comparator is used to determine how long to remain in HiZ, such that the output voltage is regulated. The Ton and Toff computations can be done in a manner which optimize the maximum current (Imax) handling capability of the regulator in PFM mode, or to minimize the output ripple voltage. The controller 102 for a regulator with asymmetric phase inductances operating in PFM can take advantage of the inductance asymmetry by supporting PFM operation in multiple phases, and by selecting the most appropriate inductance to provide minimum ripple depending on the expected load current. In one embodiment, the PFM unit 220 of the controller 102 calculates Imax, Ton and Toff as given by:

$$I_{max} = T_{on}\frac{V_{in} - V_{out}}{Lph} = T_{off}\frac{V_{out}}{Lph}, \quad (1)$$

$$T_{off} = \frac{I_{max} * Lph}{V_{out}}, \text{ and}$$

$$T_{on} = \frac{I_{max} * Lph}{V_{in} - V_{out}}$$

where Lph represents the total (effective) open circuit inductance of all power stages 100 utilized in the PFM switching mode of operation, and therefore accounts for asymmetry in the power stage output inductances. Returning to the 3-phase example in FIGS. 1 and 2 where the first power stage 100 has the highest output inductance L1, Lph=L1 if the first power stage 100 is the only stage utilized in the PFM switching mode of operation. If more than one power stage 100 has a higher output inductance than the remaining power stages 100 and are utilized in the PFM switching mode of operation, then Lph becomes the total (effective) parallel inductance of these output inductors i.e. Lph=Lph1∥Lph2∥ . . . ∥Lphn where 'L' represents open circuit inductance and 'phn' corresponds to the phase index for n power stages 100 which are in use during PFM.

According to this embodiment, the PFM unit 220 of the controller 102 computes the on (Ton) and off (Toff) PFM times as a function of the different open circuit inductances of the power stages 100 as represented by Lph in equation (1). The PFM unit 220 can select the power stage(s) 100 with the open circuit inductance best suited to minimize ripple in the current provided to the load 104 when operating in the PFM switching mode.

The PCL/NCL unit 206 of the digital controller 102 can account for the asymmetry in the power stage output inductances when limiting the phase duty cycles, to prevent exceeding the positive and negative current limits of each power stage 100. For example, current limit in the CCM switching mode of operation in a PWM-controlled buck converter can be achieved by limiting the on time (Ton) or duty cycle (D) in order to limit the peak current (Ipeak). The nominal duty cycle is given by Vin/Vout where Vin is the buck input voltage and Vout is the buck output voltage. The ripple current is given by ((Vin−Vout)*Vout)/(Vin*L*Fsw) where L is the buck inductance and Fsw is the switching frequency for fixed-frequency operation in CCM where Ton+Toff=1/Fsw. Given the average or mid-cycle current (Io), the peak current for the next cycle is a function of Ton or the duty cycle D=Ton/Toff for the next cycle. Limiting the duty cycle or Ton based on Io, Vout, Vin, Fsw, and L is therefore an effective method to limit the peak current.

According to one embodiment, the PCL/NCL unit 206 of the digital controller 102 supports asymmetric power stage output inductances by monitoring Io in each phase (Io_phn) and computing a duty cycle limit (Dlimit_phn) and/or time limit (Tlimit_phn) for each phase independently based on the open circuit inductance (Lphn) of each power stage 100 as given by:

$$I_{peak\_phn} = I_{o\_phn} + \left(D - \frac{V_{out}}{2V_{in}}\right)\frac{V_{in} - V_{out}}{Lphn * F_{sw}}, \quad (2)$$

$$D_{limit\_phn} = \frac{(I_{limit\_phn} - I_{o\_phn}) * Lphn * F_{sw}}{V_{in} - V_{out}} + \frac{V_{out}}{2V_{in}}, \text{ and}$$

$$T_{limit} = \frac{(I_{limit} - I_o) * L}{V_{in} - V_{out}} + \frac{V_{out}}{2V_{in} * F_{sw}}$$

Again returning to the 3-phase example in FIGS. 1 and 2 where the first power stage 100 has a higher output inductance L1 than the output inductance(s) L2, L3 of the other power stages 100, Lph1=L1, Lph2=L2 and Lph3=L3 in equation (2). In general, Lphn corresponds to the particular open circuit inductance of the inductor that couples the nth power stage 100 to the load 104.

The current sense unit 202 of the digital controller 102 can account for the asymmetry in the power stage output inductances when obtaining a representation of the individual inductor currents ($I_{L1}, I_{L2}, \ldots, I_{LN}$) as the voltage across a corresponding sense element, such as a series resistance, a current mirror, or a parallel sensor. For example, DCR current sense is a parallel scheme that uses the voltage across an inductor and its parasitic DC resistance (r), filtered by a time constant matched RC network, such that the voltage across the capacitor is proportional to the current flowing through the inductor. In a system with asymmetric phase inductances, both the inductance (Lphn) and resistance (r_phn) vary for at least some of the power stages 100, leading to a difference in scale and time constant for each phase current measurement (Isen_phn). The time constant mismatch can be compensated by a digital filter in the controller 102, by accounting for the different power stage output inductances Lphn as given by:

$$I_{sen\_phn} = k * I_{o\_phn} * r\frac{1 + sLphn/\text{r\_phn}}{1 + sRC}, \text{ and} \quad (3)$$

-continued $$\frac{dI}{dt} = \begin{cases} \dfrac{V_{in} - V_{out}}{Lphn} & pwm = 1 \\ -\dfrac{V_{out}}{Lphn} & pwm = 0 \end{cases}$$

This way, the current sense unit 202 of the digital controller 102 can scale the current estimates for each of the power stages 100 and adjust the time constant $$\frac{1 + sLphn/\text{r\_phn}}{1 + sRC}$$

used to compute the current estimates independently based on the open circuit inductance (Lphn) of each power stage 100. Additionally, estimation methods can be used to improve the accuracy of the current sense unit 202, e.g. using the knowledge of the expected dI/dt given the state of the corresponding PWM control signal and phase inductance (Lphn). The digital controller 102 can support improved current sense with asymmetric phase inductances by providing independent scaling and time constant compensation as well as independent current estimation to maximize the current sense accuracy.

The current balance unit 204 of the digital controller 102 can account for the asymmetry in the power stage output inductances as part of the phase current balancing function implemented by the current balance unit 204. For example in a multi-phase buck converter, individual phase currents are measured and the current in each phase can be adjusted in a manner such that the distribution of the total current over each power stage 100 is balanced (i.e. the phase current is adjusted to be essentially the same on all phases). Balancing of the phase currents can be achieved by implementing incremental differences in the PWM width (duty) applied to each power stage 100. Slightly wider PWM width results in increased phase current and slightly narrower PWM width results in decreased phase current. The current balance unit 204 detects the difference between the individual phase currents and a target current (e.g. the average of the phase currents), and applies a corresponding change to the pulse width (duty) which is proportional to this difference. The corresponding change in the phase current is then proportional to the phase width adjustment and inversely proportional to the corresponding phase inductance.

In one embodiment, the current balance unit 204 applies a change in pulse width which is proportional to the integral of the difference, or a sum of proportional (P) and integral (I) terms can also be used, and are generally defined as a current balance (IBAL) filter. Since each IBAL filter of the current balance unit 204 operates on a different phase current, generally there are multiple filters provided to support multi-phase operation. The current balance unit 204 can support improved current balance functionality for systems with asymmetric phase inductances by measuring the individual phase currents (Isen_phn) e.g. as given by equation (3), computing target phase currents for each power stage 100 based on the desired distribution of phase currents, providing an independent filter for each phase, and adjusting the gain and filter settings depending on the individual phase inductances (Lphn). In general, the digital controller 102 can compute a target current for each of the power stages 100 and control switching of each power stage 100 in accordance with the target current for that power stage 100. The current balance unit 204 can independently adjust the target currents based on the open circuit inductance (Iphn) of each power stage 100.

Figure 4:
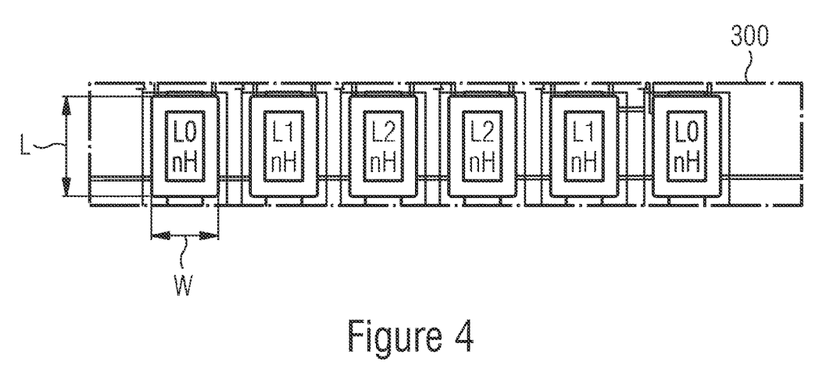
FIG. 4 illustrates a plan view of an embodiment of asymmetric phase inductors of a multi-phase switching voltage regulator arranged on a board.

FIG. 4 illustrates an embodiment of the power stage inductors (Ln) of a multi-phase switching voltage regulator attached to a board 300 such as a PCB (printed circuit board) and having asymmetric output inductances. Six power stage inductors are shown in FIG. 4. In general, at least two inductors with different open circuit inductances are provided. At least one of the inductors has a higher open circuit inductance than the other inductors. In one embodiment, at least one of the inductors has an open circuit inductance of 180 nH or greater and the other inductors have an open circuit inductance of 150 nH or less. In another embodiment, at least one of the inductors has an open circuit inductance of 220 nH or greater and the other inductors have an open circuit inductance of 150 nH or less.

Different combinations of power stage output inductances can be realized, depending on the particular application and sophistication of the controller 102. In general, the higher output inductance(s) are used during light-load conditions and all of the inductors are used during full power conditions. In one case, one of the inductors has a higher open circuit inductance than the other inductors and the other inductors have the same open circuit inductance. In the example shown in FIG. 4, the two outermost inductors have the highest open circuit inductance (L0) and are used in DCM switching mode of operation under light load conditions. The next two innermost inductors have a lower open circuit inductance (L1), and the two innermost inductors have the lowest open circuit inductance (L2). For example, L0=220 nH, L1=180 nH and L2=150 nH.

In general, at least one of the power stage output inductors has a different open circuit inductance compared to the other power stage inductors. Also, each output inductor Lx has a particular length (L) and width (W). In one embodiment, all of the inductors have the same length (L) and width (W) despite the phase inductance asymmetry. For example, different inductors can have dissimilar length (L) and/or width (W) in accordance with the phase inductance asymmetry. In another configuration, coupled inductors can be utilized for some or all of the phase inductors. A coupled inductor includes two or more separate inductors wound on the same core. The windings of a coupled inductor can be connected in series, in parallel, or as a transformer.

Coupled inductors offer a benefit in high current multi-phase buck converters in that the phase shift allows the magnetic field from the multiple coupled phases to be cancelled, which minimizes the ripple current. This reduction in ripple allows a lower inductance to be used, so that transient performance is improved and maximum phase current can be increased or the physical size of the inductor can be reduced. However, coupled inductors are not well suited for light load operation, since the inductance is low, and without the magnetic field cancellation, the ripple current is high if not all phases are active. Therefore, having an asymmetric phase with a standard (single) inductor and high inductance allows the multi-phase buck converter with coupled inductors to have high light load efficiency by deactivating the coupled inductor phases and operating just the phase with the standard (single) inductor. For example in FIG. 4, one of the inductor component Lx can be a standard (single) inductor having a higher inductance and the remaining phases can be implemented as coupled inductors, e.g. arranged as pairs of coupled inductors although it is also possible to have more than two phases coupled.

Different phase inductor types (standard and coupled) can have different lengths (L) and/or widths (W) in accordance with the phase inductance asymmetry. In any case, the inductors can be arranged in parallel on the board 300 and occupy identical footprints on the board 300, where the term 'footprint' refers to the physical layout required for each inductor on the board 300 in order to mount one of the inductors.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A multi-phase switching voltage regulator, comprising:
a plurality of power stages each configured to deliver output current to a load through an inductor, at least one of the inductors having a higher open circuit inductance than the other inductors so that at least one of the power stages has a different output inductance compared to the other power stages; and
a controller configured to control switching of the power stages so as to regulate an output voltage of the multi-phase switching voltage regulator, including allowing all of the power stages to provide current to the load through the respective inductors during a full power event at the load and preventing all of the power stages except for the at least one power stage having the higher open circuit inductance from providing current to the load during a low power event at the load,
wherein each inductor having a higher open circuit inductance is implemented as an individual inductor,
wherein each inductor with a lower open circuit inductance is implemented as a separate inductor wound on a same core of a coupled inductor so that the coupled inductor is physically separate from each individual inductor having a higher open circuit inductance.

2. The multi-phase switching voltage regulator of claim 1, further comprising a memory configured to store the different open circuit inductance values and an indication of the power stage associated with each of the different open circuit inductances.

3. The multi-phase switching voltage regulator of claim 1, wherein the controller is configured to account for the different open circuit inductances of the power stages in controlling the switching of the power stages.

4. The multi-phase switching voltage regulator of claim 3, wherein the controller is configured to compute on and off times for a discontinuous conduction switching mode of the multi-phase switching voltage regulator as a function of the different open circuit inductances of the power stages.

5. The multi-phase switching voltage regulator of claim 4, wherein the controller is configured to select the power stage with the open circuit inductance best suited to minimize ripple in the current provided to the load when operating in the discontinuous conduction switching mode.

6. The multi-phase switching voltage regulator of claim 3, wherein the controller is configured to determine a peak current limit for each of the inductors in a continuous conduction switching mode of the multi-phase switching voltage regulator independently based on the open circuit inductance of each power stage.

7. The multi-phase switching voltage regulator of claim 3, wherein the controller is configured to estimate the current in each of the inductors independently based on the open circuit inductance of each power stage.

8. The multi-phase switching voltage regulator of claim 3, wherein the controller is configured to compute a current estimate for each of the power stages, and wherein the controller is configured to scale the current estimates and adjust a time constant used to compute the current estimates independently based on the open circuit inductance of each power stage.

9. The multi-phase switching voltage regulator of claim 3, wherein the controller is configured to compute a target current for each of the power stages, control switching of each power stage in accordance with the target current for that power stage, and independently adjust the target currents based on the open circuit inductance of each power stage.

10. A digital controller for a multi-phase switching voltage regulator having a plurality of power stages each of which is configured to deliver output current to a load through an inductor, at least one of the inductors having a higher open circuit inductance than the other inductors so that at least one of the power stages has a different output inductance compared to the other power stages, the digital controller comprising:
control circuitry configured to control switching of the power stages so as to regulate an output voltage of the multi-phase switching voltage regulator, including allowing all of the power stages to provide current to the load through the respective inductors during a full power event at the load and preventing all of the power stages except for the at least one power stage having the higher open circuit inductance from providing current to the load during a low power event at the load; and
a memory configured to store the different open circuit inductance values and an indication of the power stage associated with each of the different open circuit inductances.

11. The digital controller of claim 10, wherein the control circuitry is configured to account for the different open circuit inductances of the power stages in controlling the switching of the power stages.

12. The digital controller of claim 11, wherein the control circuitry is configured to compute on and off times for a discontinuous conduction switching mode of the multi-phase switching voltage regulator as a function of the different open circuit inductances of the power stages.

13. The digital controller of claim 12, wherein the control circuitry is configured to select the power stage with the open circuit inductance best suited to minimize ripple in the current provided to the load when operating in the discontinuous conduction switching mode.

14. The digital controller of claim 11, wherein the control circuitry is configured to determine a peak current limit for each of the inductors in a continuous conduction switching mode of the multi-phase switching voltage regulator independently based on the open circuit inductance of each power stage.

15. The digital controller of claim 11, wherein the control circuitry is configured to estimate the current in each of the inductors independently based on the open circuit inductance of each power stage.

16. The digital controller of claim 11, wherein the control circuitry is configured to compute a current estimate for each of the power stages, and wherein the control circuitry is configured to scale the current estimates and adjust a time constant used to compute the current estimates independently based on the open circuit inductance of each power stage.

17. The digital controller of claim 11, wherein the control circuitry is configured to compute a target current for each of the power stages, control switching of each power stage in accordance with the target current for that power stage; and independently adjust the target currents based on the open circuit inductance of each power stage.

18. A multi-phase switching voltage regulator, comprising:
a plurality of power stages each configured to deliver current to a load, each of the power stages comprising a high-side transistor and a low-side transistor coupled at a common node to the load through an inductor, at least one of the power stage inductors having a higher open circuit inductance than the other power stage inductors so that the at least one power stage has a different output inductance compared to the other power stages; and
a controller configured to control switching of the power stages to regulate an output voltage of the multi-phase switching voltage regulator,
wherein each inductor having a higher open circuit inductance is implemented as an individual inductor, wherein each inductor with a lower open circuit inductance is implemented as a separate inductor wound on a same core of a coupled inductor, so that the coupled inductor is physically separate from each individual inductor having a higher open circuit inductance.

19. The multi-phase switching voltage regulator of claim 18, wherein one of the power stage inductors has a higher open circuit inductance than the other power stage inductors and the other power stage inductors have the same open circuit inductance.

20. The multi-phase switching voltage regulator of claim 18, wherein all of the power stage inductors have the same length and width.

21. The multi-phase switching voltage regulator of claim 18, wherein at least one of the power stage inductors has an open circuit inductance of 180 nH or greater and the other power stage inductors have an open circuit inductance of 150 nH or less.

22. The multi-phase switching voltage regulator of claim 18, wherein at least one of the power stage inductors has an open circuit inductance of 220 nH or greater and the other power stage inductors have an open circuit inductance of 150 nH or less.

23. The multi-phase switching voltage regulator of claim 18, wherein the power stage inductors are arranged in parallel on a printed circuit board and occupy identical footprints on the printed circuit board.

24. The multi-phase switching voltage regulator of claim 18, wherein the controller is configured to switch the power stages at the same frequency but not at uniform spacing.

25. The multi-phase switching voltage regulator of claim 18, wherein the controller is configured to switch the power stages at different frequencies.

26. The multi-phase switching voltage regulator of claim 18, wherein the controller is configured to switch the power stages at non-uniform sequencing.

* * * * *